June 27, 1967  A. M. FUCHS  3,328,686

D.C. ANALOG SPECTRUM ANALYZER

Filed Aug. 31, 1964  3 Sheets-Sheet 1

INVENTOR
ABRAHAM M. FUCHS
BY Hurvitz & Rose
ATTORNEYS

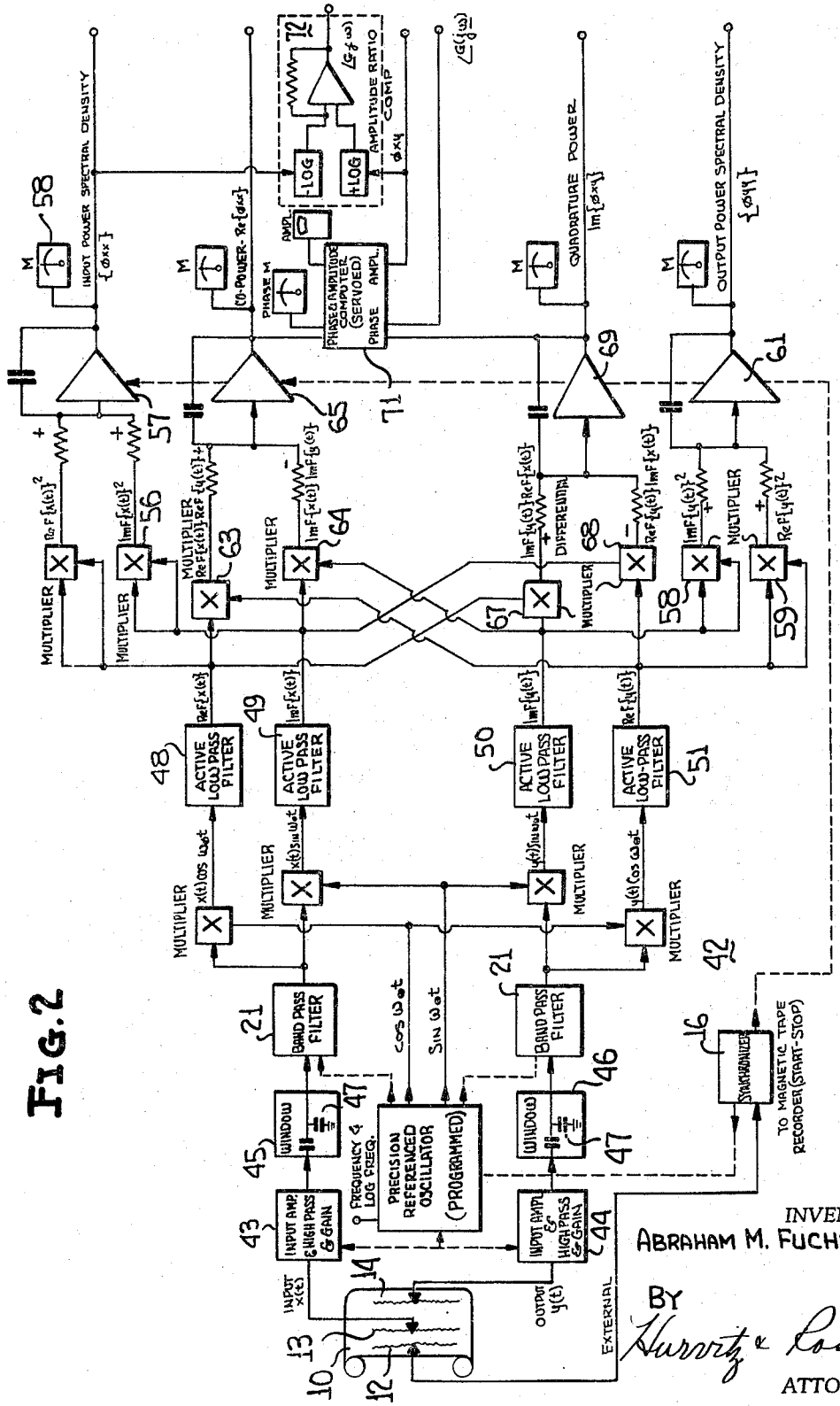

INVENTOR
ABRAHAM M. FUCHS

BY Hurvitz & Rose

ATTORNEYS

United States Patent Office 3,328,686
Patented June 27, 1967

3,328,686
D.C. ANALOG SPECTRUM ANALYZER
Abraham M. Fuchs, Rydal, Pa., assignor to Weston
Instruments, Inc., a corporation of Texas
Filed Aug. 31, 1964, Ser. No. 393,435
13 Claims. (Cl. 324—77)

The present invention relates generally to non-scan spectral analysis equipment and, more particularly, to systems for computing Fourier transforms and other spectral information, which systems are provided with a band pass filter betwen the analyzed signal source and the computer input.

A time varying signal, $f(t)$, extending over a period T is transformed into the frequency domain to derive spectral information by the Fourier transform:

$$F\{f(t)\} \int_0^T f(t)e^{-jw_0 t}dt = H(jw_0) \quad (1)$$

Since $e^{-jw_0 t} = \cos w_0 t - j \sin w_0 t$, Equation 1 can be expanded into:

$$\int_0^T f(t) \cos w_0 t\, dt - j\int_0^T f(t) \sin w_0 t\, dt \equiv$$

$$RF\{f(t)\} - jIF\{f(t)\}$$

Since $F\{f(t)\}$ has real and imaginary parts, its magnitude $|F\{f(t)\}|$ is expressed by $$\sqrt{[RF\{f(t)\}]^2 + [IF\{f(t)\}]^2} \quad (3)$$

and its phase angle, $\phi$, by $$\tan^{-1} \frac{IF\{f(t)\}}{RF\{f(t)\}} \quad (4)$$

The expression for magnitude provides an indication of the total real and quadrature energy in $f(t)$ at frequency $w_0$ while the value of $\phi$ is related to the ratio of quadrature to real power in $f(t)$ at $w_0$.

If a system being tested has an input $X(t)$ and an output $Y(t)$, its transfer function $G(jw_0)$ at the specified frequency $w_0$ is given as:

$$G(jw_0) = \frac{F\{Y(t)\}}{F\{X(t)\}} \quad (5)$$

The amplitude and phase angle change that $X(t)$ undergoes in propagating through the network are hence respectively:

$$|G(jw_0)| = M(jw_0) = \sqrt{\frac{[RF\{f(y)\}]^2 + [IF\{f(y)\}]^2}{[RF\{f(x)\}]^2 + [IF\{f(x)\}]^2}}$$

and $$\underline{/G(jw_0)} = \phi(jw_0) = \tan^{-1}\frac{\{IF\{y\}}{\{RF\{y\}} - \tan^{-1}\frac{IF\{x\}}{RF\{x\}} \quad (6)$$

Another manner by which $M(jw_0)$ and $\phi(jw_0)$ can be computed from $X(t)$, in the case where $X(t)$ is a random signal, is by computing the power spectral density of both $X(t)$ and $Y(t)$ and the cross power density between $X(t)$ and $Y(t)$. The input and output power spectral densities, $\phi_{xx}$ and $\phi_{yy}$, of $X(t)$ and $Y(t)$ at any one $w_0$ for signal of duration T are given by the expression:

$$\phi_{xx} = \frac{1}{T}|F\{f(x)\}|^2 \quad (7)$$

and $$\phi_{yy} = \frac{1}{T}|F\{f(y)\}|^2 \quad (8)$$

The cross power in phase or co-power density, $R\{\phi_{xy}\}$, and quadrature phase density, $I(\phi_{xy})$, between $X(t)$ and $Y(t)$ are given by $$R(\phi_{xy}) = \frac{1}{T}[RF\{X(t)\}RF\{Y(t)\} + IF\{X(t)\}IFY(t)] \quad (9)$$

and $$I(\phi_{xy}) = \frac{1}{T}[IF\{Y(t)\}RF\{X(t)\} - RF\{Y(t)\}IF\{X(t)\}] \quad (10)$$

A physical feeling for $R\{\phi_{xy}\}$ and $I\{\phi_{xy}\}$ is derived by considering their values for two different sets of $X(t)$ and $Y(t)$. If $X(t)$ and $Y(t)$ are identical, $R\{\phi_{xy}\} = \phi_{xx} = \phi_{yy}$, i.e. the input and output power densities are equal to each other and to the real cross power density. In contrast, there is no quadrature power between $X(t)$ and $Y(t)$ at $w_0$, so $I\{\phi_{xy}\}$ is zero. If $X(t)$ and $Y(t)$ are of the same amplitude, but always phase shifted by 90°, $$\phi_{xx} = \phi_{yy} = I\{\phi_{xy}\}, \text{ but } R\{\phi_{xy}\} = 0$$

To derive the phase shift introduced by the equipment tested, $|G(jw_0)|$, i.e. the phase difference between $X(t)$ and $Y(t)$ at frequency $w_0$, $$\tan^{-1}\frac{I(\phi_{xy})}{R(\phi_{xy})}$$

is computed. The total cross power $\phi_{xy}$ between $X(t)$ and $Y(t)$ at frequency $w_0$ is determined in response to $$\phi_{xy} = \sqrt{R\{\phi_{xy}\}^2 + I\{\phi_{xy}\}^2} \quad (11)$$

The magnitude of the system transfer function, $|G(jw_0)|$, is determined by dividing $\phi_{xx}$ into $\phi_{xy}$.

The present invention computes the various functions and derives spcetral information regarding $X(t)$ and $Y(t)$ by employing computers responsive to the monitored variables and a non-scanned oscillation source. For the various values of $w_0$ at which analysis is desired, the frequency of the oscillation source is set to provide $\sin w_0 t$ and $\cos w_0 t$ inputs for the $R[F\{f(t)\}]$ and $I[F\{f(t)\}]$ computations. Since transient anlaysis of $X(t)$ and $Y(t)$ is of considerable interest, it is important that $\sin w_0 t$ and $\cos w_0 t$ be initially derived as steady state signals, without transient. The present invention achieves this result with an oscillator comprised of a pair of D.C., high gain analog integrator circuits. The integrator storage capacitors are initially set to values commensurate with $\sin wt$ and $\cos wt$ at $t=0$ so that initially steady state oscillations are derived. A further feature of the oscillator is the ability to vary the output signal through 360°. This insures that only the gain and phase characteristics of the item under test are taken into consideration.

In analyzing $X(t)$ and $Y(t)$, it is frequently the practice to record them on separate tracks of a tape recorder. In playback, however, tape recorders frequently introduce variable D.C. bias levels and high frequency noise. To obviate these problems, a band pass filter having transfer function:

$$\frac{\dfrac{jw}{aw_0}}{\dfrac{jw}{aw_0}+1} \cdot \dfrac{1}{\dfrac{jw}{bw_0}+1} \quad (12)$$

where
$w$ is a particular angular frequency of $X(t)$ or $Y(t)$;
$a$ and $b$ are constants; and
$w_0$ is the frequency of the oscillating source;
is provided between the tape inputs and the computer. Such a filter enables analyzation of low power signals into the noise characteristics of the tape.

Another feature of the invention is in the use of gating window for coupling input to the computer only over a specified time interval so that only the signal portions of interest are analyzed. In one embodiment, the window goes from a completely open to a completely closed condition in accordance with a step function. Because the step function can introduce undesirable transients into the analyzed signal, a window modification is provided wherein the analyzed signal amplitude is slowly brought up to full value immediately prior to and upon completion of the interval of interest.

To integrate in accordance with one species of the invention, a seventh order low pass filter having the transfer function:

$$\frac{1}{\left[\frac{jw}{w_f}+1\right]^2\left[\left(\frac{jw}{w_f}\right)^2+2(0.4)\frac{w}{w_f}+1\right]^2\left[\frac{jw}{w_f(1.12)}+1\right]} \quad (13)$$

where $w_f$ is the integrator low pass cut off frequency, is provided. This function, which can be readily synthesized with analog computer D.C. operational amplifiers, is the optimum compromise between speed of response and cut off sharpness. Fast speed of response is introduced by the term $$\frac{1}{\left[\left(\frac{jw}{w_f}\right)^2+\frac{2(0.4)jw}{w_f}+1\right]^2} \quad (14)$$

The remaining terms, as well as the term indicated by Equation 14, contribute to sharpness beyond the cut off frequency.

It is, accordingly, an object of the present invention to provide new and improved non-scan spectral analyzer computers.

Another object of the invention is to provide a non-scan spectral analyzer for deriving transfer function information of a test system in response to the cross spectrum between the signals applied to and derived from the system.

An additional object of the invention is to provide a new and improved non-scan spectral analyzer employing two phase oscillators that go directly into steady state operation, substantially without transient.

A further object of the invention is to provide a non-scan spectrum analyzer for deriving Fourier transforms of signals applied to it, wherein D.C. and noise fluctuations of the signals are removed prior to computation so analysis of low level signals is achieved.

Yet another object of the invention is to provide a Fourier transform spectrum analyzer employing an integrator or low pass filter having optimum compromise between response time and cut off sharpness.

Still another object of the invention is to provide a Fourier transform computer particularly adapted for spectral analysis of only a predetermined interval of a time varying signal, which computer introduces substantially no transients into its input signal.

The above and still further objects, features and advantages of the present invention will become apparent upon consideration of the following detailed description of one specific embodiment thereof, especially when taken in conjunction with the accompanying drawings, wherein:

FIGURE 2 is a block diagram of a spectral and cross spectral analyzer embodying the concepts of the present invention;

Figure 1:
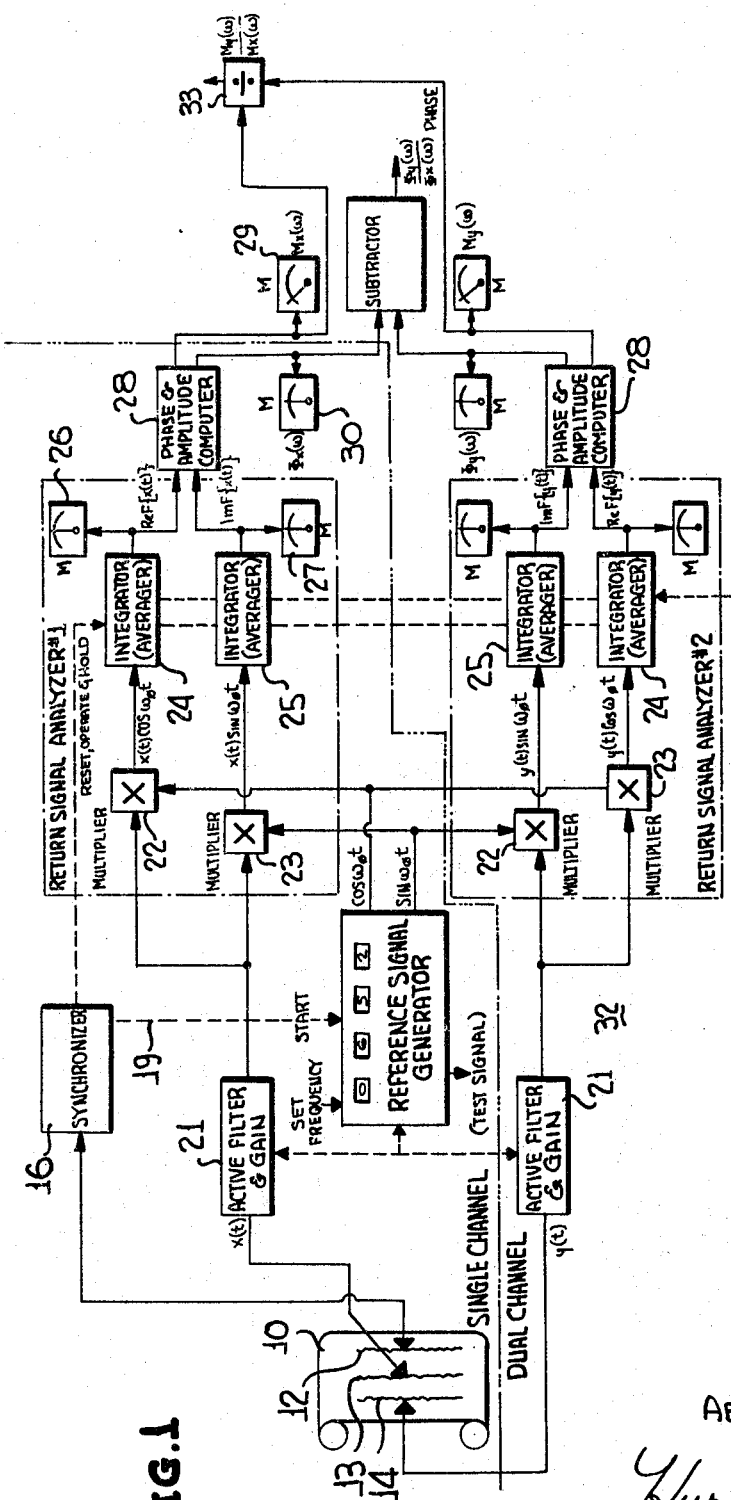
FIGURE 1 is a block diagram of a Fourier transform analyzer embodying the concepts of the present invention.

Reference is now made to FIGURE 1 wherein tape recorder 10 comprises synchronizing track 12, and signal carrying tracks 13 and 14 respectively replicas of the input and output responses $X(t)$ and $Y(t)$ of a piece of tested equipment. The apparatus of FIGURE 1 analyzes $X(t)$ and $Y(t)$ to derive their Fourier transforms and the transfer functions of the tested equipment.

Typically transient, rather than steady state analysis, is performed with the apparatus of FIGURE 1, although the latter may be achieved. With transient analysis, triggering pulse is provided on track 11 at a predetermined position ahead of $X(t)$ and $Y(t)$ records on channels 13 and 14 because various elements in the system e.g. integrating capacitors, must be reset prior to application of $X(t)$ and $Y(t)$ to the analyzer. Simultaneously with the beginning and end of $X(t)$ and $Y(t)$ on channels 13 and 14, start and stop pulses are respectively derived by a timer included in synchronizer 16. The start pulses remove the effects of the resetting operations on the integrating capacitors, hence enable these capacitors to operate correctly in response to the signals applied to them from predetermined initial conditions while the stop pulses hold the capacitors at the same state they occupied at the signal record termination. Synchronizer 16 is provided for supplying the reset, start and stop pulses to the various integrating capacitors in the system.

At the heart of the analyzer is a reference signal generator 18, including a variable frequency oscillator with a pre-settable range between 0.001 and 1000 c.p.s., or more. Generator 18 provides a pair of orthogonal outputs, sin $w_0t$ and cos $w_0t$; where $w_0$ is the selected frequency of generator 18 for which the Fourier transforms are to be derived. A feature of generator 18 is that its outputs are derived with substantially no transient, an important, if not essential, aspect in analyzing transient signals. To enable integrating capacitors in generator 18 to be always initially set at the proper value, preclude transients, and derive the sin $w_0t$ and cos $w_0t$ outputs simultaneously with the beginning of $X(t)$ and $Y(t)$, the output reset and start pulses of synchronizer 16 are applied to the generator via line 19.

The input signal analyzing track for channel 12 comprises calibrated, active, band pass filter 21 having a response function of $$\frac{\frac{jw}{aw_0}}{\frac{jw}{aw_0}+1} \cdot \frac{1}{\frac{jw}{bw_0}+1} \quad (15)$$

where:

$w$=the particular angular frequency in the signal $X(t)$ being analyzed.

$a$=the high pass break frequency factor, selectively equal to 1, 0.5, 0.10.

$b$=the low pass break frequency factor, selectively equal to 1, 2, 10.

It is understood that $aw_0$ and $bw_0$ are the filter high and low cut off frequencies, respectively. The first half of Equation 15 represents the high pass portion of filter 21, utilized to remove spurious noise and signals from $X(t)$ while the second half is the low pass segment that maintains the $X(t)$ signal supplied to the analyzer centered about zero. D.C. bias fluctuations of the signal are removed by the action of the high-pass filter. The band pass action of filter 21 restricts the signal input to the immediate frequency range of interest. In those cases where the greatest energy content of $X(t)$ is at frequencies considerably above or below the analysis frequency, $w_0$, the system can be scaled to very accurate sensitivity levels, whereby analysis into the noise level deriving from recorder 11 is feasible.

The values of $a$ and $b$ in filter 21 are set by the operator, dependent upon his experience with the particular signal being analyzed. As the operator sets the various oscillation frequencies ($w_0$) of generator 18, he likewise sets the center frequency of the pass-band of filter 21 to the value $w_0$.

The signal derived from filter 21 is applied in parallel to three quadrant multipliers 22 and 23, capable of multiplying with correct sign an $X(t)$ input signal having any polarity. Multipliers 22 and 23 are of the variable pulse width and height type so that true signal multiplication, without signal modulation, is derived. Signal modulation multipliers are generally to be avoided in a precise analyzer having low frequency inputs because of problems involved in filtering the carrier and one of the sidebands from the other sideband.

The $X(t) \cos w_0 t$ and $X(t) \sin w_0 t$ signals deriving from multipliers 22 and 23 are applied to integrators 24 and 25, respectively, of the conventional D.C. analog computer type. The capacitors of integrators 24 and 25 are short circuited by the reset output of synchronizer 16 to remove charge remaining on them from the previous computation cycle. When the start signal is generated by synchronizer 16, the short circuit is removed from the integrator capacitors and they are free to be charged in response to the input signal applied to their respective integrators. When playback of $X(t)$ has been completed, the voltage across the integrating capacitors is held constant by grounding the input terminals of integrators 24 and 25. Thereby, subsequent to completion of the computation cycle, the real and imaginary components of the Fourier transform of $X(t)$ for frequency $w_0$ may be read from zero center reading D.C. voltmeters 26 and 27, connected to the outputs of integrators 24 and 25, respectively. All frequencies other than that component of the input signal which is at the reference frequency $w_0$ are rejected by 40 db. Unwanted signals as close as ⅛ of a cycle away from $w_0$ will be rejected. The gains of integrators 24 and 25, as determined by their RC time constants, are controlled by a setting that is varied in accordance with the time of the recording being played back. For long records the time constant selected is quite large, on the order of 100 seconds, while with shorter records, it is on the order of 10 seconds, or may even be 1.0 second.

To determine the magnitude and phase shift of the Fourier transform of $X(t)$ for frequency $w_0$, the outputs of integrators 24 and 25 are applied to separate inputs of a phase and amplitude computer 28. Computer 28, preferably of the form shown on page 286 of "Electronic Analog Computers" (Korn and Korn) 1952, McGraw-Hill Publishing Co., derives outputs equal to $$\sqrt{[R_E F\{X(t)\}]^2 + [I_m F\{X(t)\}]^2}$$

the magnitude of the Fourier transform, and $$\tan^{-1}\frac{IF\{X(t)\}}{RF\{X(t)\}}$$

the phase angle of the Fourier transform; where $$RF\{X(t)\}$$

and $$IF\{X(t)\}$$

are the real and imaginary parts of the Fourier transform. The magnitude and phase indicating output signals of computer 28 are respectively read by D.C. voltmeter 29 and phase dial 30.

To provide similar information regarding the output signal of the tested equipment, $Y(t)$, a second computer channel 32 having identical characteristics as the one for $X(t)$ is provided. The multipliers of the second channel are fed in parallel with those of the first by the $\cos w_0 t$ and $\sin w_0 t$ outputs of generator 18 while the second channel integrators are controlled by the reset, operate and hold outputs of synchronizer 16 exactly as are integrators 24 and 25. Also, the RC time constants of the integrators in the second channel are varied with the time constants of integrators 24 and 25.

To derive the transfer function of the equipment having its input and output responses recorded on channels 13 and 14, divider 33 and subtractor 34 are provided. Circuit 33 divides the $$\sqrt{[R_E F\{X(t)\}]^2 + [I_m F\{X(t)\}]^2}$$

magnitude output of the first channel into the $$\sqrt{[R_E F\{Y(t)\}]^2 + [I_m F\{Y(t)\}]^2}$$

magnitude output of channel 32, to derive a signal indicative of the magnitude change introduced by the equipment tested. Circuit 34 subtracts the input phase angle for $X(t)$, deriving from computer 28, from the output phase angle for $Y(t)$, deriving from channel 32, to provide a signal proportional to the phase shift introduced by the tested equipment.

When it is desired to determine the Fourier transform and response of the equipment tested for another frequency, recorder 11 is set back to its initial state, the frequency of signal generator 18 is set to another value and the time constants in the active filters are correspondingly adjusted.

Reference is now made to FIGURE 2 of the drawings, a system for computing the co-power and quadrature power relationships between random transient or steady state input and output signals derived from a signal source or piece of tested equipment. $X(t)$ and $Y(t)$ are derived from magnetic recorder 10 exactly as in the embodiment of FIGURE 1. Signals $x(t)$ and $y(t)$ are operated upon by channels 41 and 42 to derive $RF\{x(t)\}$, $IF\{x(t)\}$, $RF\{y(t)\}$ and $IF\{y(t)\}$ in a manner similar to that by which the same functions are generated with the FIGURE 1 system.

In FIGURE 2, however, high pass, active filters 43 and 44 having $$\frac{\frac{w}{aw_0}}{\frac{w}{aw_0}+1}$$

transfer functions are connected directly to the $x(t)$ and $y(t)$ signals deriving from channels 12 and 13. The cut off or break frequencies of high gain filters 43 and 44 can be independently selected at either 0.01 or 0.001 c.p.s., depending upon the spectrum of $x(t)$ and $y(t)$.

The outputs of high pass filters 43 and 44 are respectively applied to windows 45 and 46. Each window includes a normally closed shunt switch 47 that is opened and closed in response to the start and stop signals deriving from synchronizer 16. Hence, signals are propagated through windows 45 and 46 only during the period when it is desired to analyze signal. To prevent transients from being introduced when windows 45 and 46 are opened or closed their step function mode of operation may be replaced with a gradual operating characteristic by using the apparatus of FIGURE 6, described infra.

The band pass and gain characteristics before the multipliers are also incorporated, by using filters 21 of the type utilized in FIGURE 1.

The simple integrators of FIGURE 1 are replaced in FIGURE 2 with active low pass filters 48–51, each having a transfer function equal to $$\frac{1}{\left[\frac{jw}{w_f}+1\right]^2 \left[\left(\frac{jw}{w_f}\right)^2 + \frac{2(0.4)jw}{w_f}+1\right]^2 \left[\frac{jw}{1.12w_f}+1\right]} \quad (16)$$

where:

$w$ is the signal frequency applied to the low pass filter; and
$w_f$ is the filter cut off frequency selected by the operator.
$w_f$ must be selected to give a flat response over the required bandwidth, in order to produce the average energy for power spectrum density computation. The filter response time is enhanced by the slight positive feedback introduced by the $$\frac{1}{\left[\left(\frac{jw}{w_f}\right)^2 + 2\frac{(0.4)jw}{w_f} + 1\right]^2}$$

term in the transfer function. This transfer function represents optimum compromise between speed of response and cut off sharpness in the high frequency region.

To compute input power spectral density, $\phi_{xx}(w_0)$, for the $x(t)$ signal, the $R_EF\{x(t)\}$ and $I_mF\{x(t)\}$ outputs of filters 48 and 49 are squared in multipliers 55 and 56, respectively. The squared outputs of multipliers 55 and 56 are additively combined in summing and integrating amplifier 57, that generates $$\phi_{xx} = \int_0^T ([RF\{x(t)\}]^2 + [2F\{x(t)\}]^2)$$

$dt$ as a signal that is read from D.C. voltmeter 58. Similarly, the power spectral density of $y(t)$ $$\phi_{yy} = \int_0^T ([RF\{y(t)\}]^2 + [2F\{y(t)\}]^2$$

$dt$ is derived by multipliers 58, 59 and integrating, summing amplifier 61 in response to the $R_EF\{y(t)\}$ and $I_mF\{y(t)\}$ signals generated by filters 50 and 51.

To compute the co-power or inphase spectrum of $x(t)$ and $y(t)$, $$R\{\phi_{xy}\} = \int_0^T (RF\{x(t)\}RF\{y(t)\} + IF\{x(t)\}IF\{y(t)\})dt$$

multipliers 63, 64 as well as integrator, summing amplifier 65 are provided. Multiplier 63 is responsive to the outputs of filters 48 and 51 while the inputs for multiplier 64 are derived from filters 49 and 50. The outputs of filters 63 and 64 are linearly added and then integrated in amplifier 65, which generates the $R\{\phi_{xy}\}$ signal.

The quadrature or out of phase power spectrum $x(t)$ and $y(t)$, $$I\{\phi_{xy}\} = \int_0^T IF\{y(t)\}RF\{x(t)\} - RF\{y(t)\}IF\{x(t)\}dt$$

is derived by combining the outputs of filters 48, 50 in multiplier 67 and the outputs of filters 49, 51 in multiplier 68. The signal deriving from multiplier 68 is subtracted from the output of multiplier 67 in subtracting, integrating amplifier 69 to produce $I\{\phi_{xy}\}$.

To provide indications of the total cross power spectral density and phase angle between $x(t)$ and $y(t)$ at $w_0$, $\phi_{xy}$ and $\angle G(jw)$, the $R\{\phi_{xy}\}$ and $I\{\phi_{xy}\}$ signals derived from integrators 65 and 69 are applied to phase and amplitude computer 71. Computer 71, of the type referred to supra with regard to FIGURE 1, derives $\phi_{xy}$ as $$\sqrt{[R\{\phi_{xy}\}]^2 + [I\{\phi_{xy}\}]^2}$$

and $\angle G(jw)$ as $$\tan^{-1}\frac{I\{\phi_{xy}\}}{R\{\phi_{xy}\}}$$

The transfer function magnitude of the network tested, $G(jw)$, is derived by dividing, in network 72, the $\phi_{xy}$ output of computer 71 by the $\phi_{xx}$ signal generated by integrating amplifier 57. The resultant equation is $$\phi_{xy}(jw) = G(jw)\phi_{xx}(w)$$

Integrators 57, 61, 65 and 69 are provided with variable RC time constants, selected on the same basis as the time constants of integrators 24, 25 of FIGURE 1. As in FIGURE 1, each of the storage capacitors employed is short circuited at the beginning of each computation or analyzer cycle. While the various meters responsive to the finally computer quantities, $\phi_{xx}$, $\phi_{yy}$, $\phi_{xy}$, $R\{\phi_{xy}\}$, $I(\phi_{xy})$, $|G(jw_0)|$ and $\angle G(jw_0)$ have not been discussed, it is understood that appropriate D.C. voltmeters are connected across the various output terminals. The signals on these lines at the end of each computation cycle can also be monitored with analog to digital printout equipment.

Figure 3:
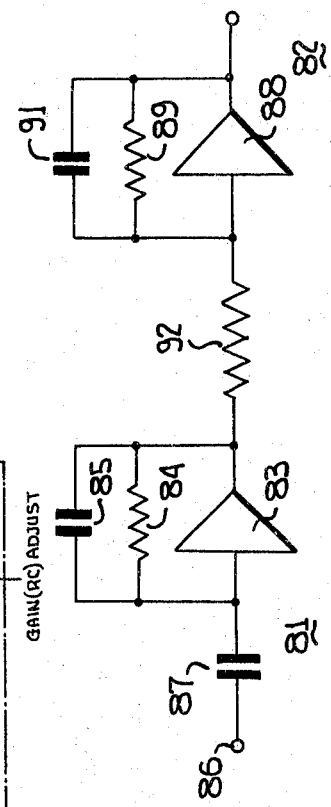
FIGURE 3 is a circuit diagram of a preferred embodiment of the band pass filter employed in FIGURES 1 and 2.

Reference is now made to FIGURE 3, a circuit diagram of the band pass filters of FIGURES 1 and 2. The filter comprises two separate sections 81 and 82. Section 81 introduces the high pass response portion of the transfer function, $$\frac{\frac{w}{aw_0}}{\frac{w}{aw_0} + 1}$$

It comprises high gain operational D.C. amplifier 83, having as its feedback network the parallel combination of resistor 84 and capacitor 85. Connected between filter input terminal 86 and the amplifier input is capacitor 87, having the same value as capacitor 85. To introduce the $aw_0$ variations into the filter response, the value of resistance 84 is changed and or the values of capacitors 85, 87 are changed together.

The low pass portion of the band pass filter, section 82, having the transfer function $$\frac{1}{1 + \frac{jw}{bw_0}}$$

is provided with amplifier 88, having its input cascaded with the output of amplifier 83. The feedback network of amplifier 88 comprises the parallel combination of resistor 89 and capacitor 91. The input network of amplifier 88 consists of resistor 92, that is ganged with resistor 89 so both have the same value. The values of resistors 89, 92 and capacitor 91 are varied to introduce the different $bw_0$ factors.

Figure 4:
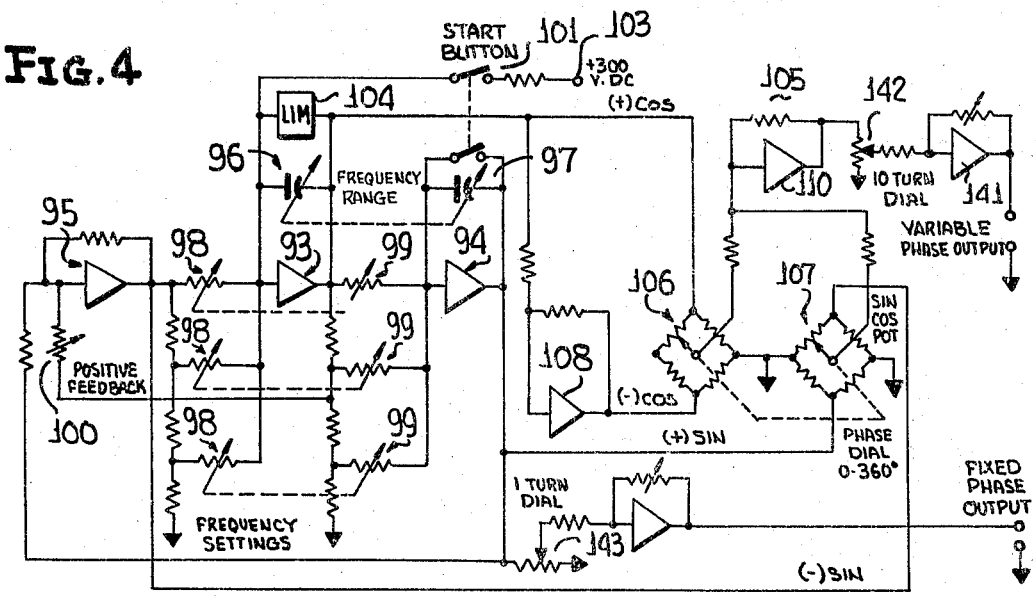
FIGURE 4 is a circuit diagram of a preferred embodiment of the oscillator utilized in FIGURES 1 and 2.

Reference is now made to FIGURE 4 of the drawings, a circuit diagram of oscillator 18 employed in FIGURES 1 and 2. Oscillator 18 comprises a positive feedback network including integrators 93, 94 and sign inverting, signal amplifier 95, all of which are cascaded together. The output of integrator 93 is coupled back to the input of amplifier 95 via a positive feedback path including resistor 100 to insure oscillation. The frequency of oscillation, $w_0$, is selected solely by varying the values of feedback capacitors 96, 97 and input resistors 98, 99 of integrators 93, 94, respectively.

Because the system must commence with virtually no transients and the oscillator derives a pair of signals phase displaced by 90°, capacitors 96 and 97 are connected with initial condition establishing circuits, comprising switches 101 and 102, respectively. Switches 101 and 102 are closed in response to the synchronizer reset output to initially apply a fixed finite voltage and zero voltage to capacitors 96 and 97, respectively; the finite voltage being applied by the high voltage at terminal 103 and limiter 104 that shunts capacitor 96. When switches 101 and 102 are opened in response to the synchronizer start signal, the phase displaced sinusoidal outputs of integrators 93 and 94 are at values proportioned as one and zero, the values of cos $w_0 t$ and sin $w_0 t$ at time $t=0$. Hence, correct initial values are derived for the output of phase oscillators generated. As oscillator 18 proceeds into the steady state to derive sinusoidal waves in accordance with $$\frac{d^2 e}{dt^2} = -w_0^2 e$$

no transient is derived because capacitors 96 and 97 are initially charged to their steady state values.

Because the outputs of integrators 93 and 94 may not be phase displaced by exactly 90° or to provide a pair of variable phase outputs, network 105 is provided. Network 105 includes two sine-cosine potentiometers 106 and 107, having ganged sliders to introduce the desired phase shift. Potentiometers 106 and 107 are driven at their opposite ends by phase reversed cosinusoidal and sinusoidal voltages derived from integrators 93 and 94, respectively. Phase reversal between the outputs of integrators 93 and 94 and one input of each potentiometer is attained through inverting amplifiers 108 and 95, respectively. The outputs of potentiometers 106 and 107, at sliders thereof, are linearly combined in summing amplifier 110 to provide a signal of controlled phase. The output of summing amplifier 110 feeds isolating amplifier 141 via variable resistive voltage divider 142. Amplitude control of the fixed phase signal deriving from integrator 94 is attained via potentiometer 143 that feeds amplifier 144.

Figure 5:
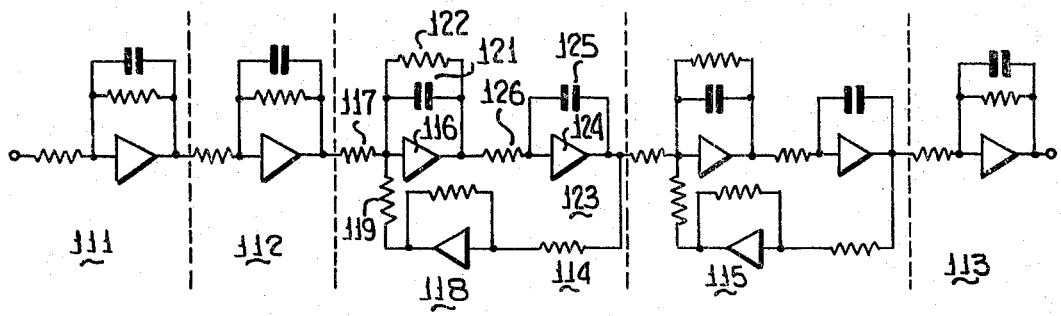
FIGURE 5 is a circuit diagram of a preferred embodiment of the low pass filter employed in FIGURE 2.

Reference is now made to FIGURE 5, a circuit diagram of the seventh order, low pass filter utilized in FIGURE 2. The first two and last sections 111, 112 and 113 of the filter include cascaded low pass active elements having the same circuit configuration as low pass section 82, FIGURE 3. In each case, the feedback and input resistors are ganged to have identical values. The impedances of sections 111 and 112 remain identical in all cases to provide the $$\frac{1}{\left(\frac{jw}{wf}+1\right)^2}$$

segment of the response while the impedances in section 113 differ slightly from those in sections 111 and 112 to provide the $$\frac{1}{\frac{jw}{1.12w_f}+1}$$

response.

Center sections 114 and 115 are identical to provide the $$\frac{1}{\left[\left(\frac{w}{w_f}\right)^2+2(0.4)\frac{w}{w_f}+1\right]^2}$$

positive feedback portion of the filter response. Since sections 114 and 115 are identical, a description of only the first suffices. The input and output signals of section 114 are combined in summing amplifier 116. The input connection is via resistor 117 and the output connection through inverting amplifying network 118 and resistor 119. The feedback network of amplifier 116 comprises the parallel combination of integrating capacitor 121 and resistor 122. The output of amplifier 116 is supplied to integrator 123, comprising amplifier 124, feedback capacitor 125 and input resistor 126. The signal deriving from integrator 123 comprises the output of section 118 and is coupled directly to the input of section 115.

It can be shown that the output voltage, $e_0$, of section 114, is related to its input voltage, $e_1$, by $$e_0 = \frac{d^2e_1}{dt^2} + \frac{ade_1}{dt^2} + be_1$$

Proper selection of the capacitors and resistors in network 114 enables this differential equation to be transformed into a steady state transfer function of the desired form, $$\frac{1}{\left(\frac{w}{w_f}\right)^2+2(0.4)\frac{w}{w_f}+1}$$

Figure 6:
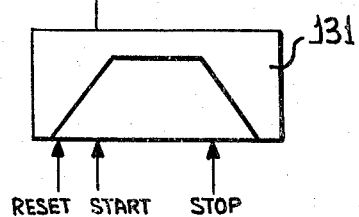
FIGURE 6 is a block diagram of a modified window in the circuit of FIGURE 2.

Reference is now made to FIGURE 6 of the drawings, a block diagram of a modification of windows 45 and 46 in FIGURE 2. The modified window includes ramp voltage generator 131 that provides one input to two quadrant multiplier 132, the other input of which is derived from high pass filter 43. Ramp voltage generator 131 includes a linear excursion that is started from zero in response to the reset signal being applied thereto by the synchronizer. The linear excursion continues until the synchronizer feeds the start signal to ramp generator 131, at which time the generator output becomes constant at the ramp value derived when the start signal occurred. The output of generator 131 remains constant until the stop signal is applied thereto by synchronizer 16. Thereafter, the ramp generator output decreases linearly to zero, awaiting a new reset signal. By multiplying the input signal with the gradual ramp variations, severe transients are not generated when the system is initially and finally subjected to $x(t)$ and $y(t)$.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a non-scanned analyzer for deriving the real and imaginary Fourier transforms of an input signal $f(t)$ over an interval $0 \leq t \leq T$, a non-scanned oscillator deriving out of phase oscillations $\sin w_0 t$ and $\cos w_0 t$, said oscillator including a pair of integrators connected in a positive feedback network, means for setting said integrators at $t=0$ so said $\sin w_0 t$ and $\cos w_0 t$ oscillations are derived substantially without transients, a first multiplier responsive to $f(t)$ and $\sin w_0 t$, a second multiplier responsive to $f(t)$ and $\cos w_0 t$, and means responsive to outputs of said multipliers for deriving said transforms.

2. The system of claim 1 further including window means for gating $f(t)$ to said multipliers only during the interval $0 \leq t \leq T$.

3. The system of claim 2 wherein said window means includes means for slowly varying the amplitude of $f(t)$ just before and after said interval, said amplitude being monotomically varied away from zero just before said interval and toward zero just after said interval.

4. A system for deriving the transfer function of tested equipment in response to an input $x(t)$ and an output $y(t)$ of said equipment having means responsive to $x(t)$ and $y(t)$ for deriving the real $R\{\phi_{xy}\}$ and imaginary $I\{\phi_{xy}\}$ parts of the cross spectrum between $x(t)$ and $y(t)$ comprising a non-scanned oscillator deriving out of phase oscillations $\sin w_0 t$ and $\cos w_0 t$, first and second channels respectively responsive to $x(t)$ and $y(t)$, said first and second channels both being responsive to said out of phase oscillations for respectively deriving the real and imaginary Fourier transforms of $x(t)$ and $y(t)$ at a selected analysis frequency $w_0$, said means for deriving said real part of said cross spectrum comprising first means for multiplying together said real Fourier transforms of $x(t)$ and $y(t)$, second means for multiplying together said imaginary Fourier transforms of $x(t)$ and $y(t)$, and means for adding the output signals from said first and second multiplying means, and means responsive to $R\{\phi_{xy}\}$ and $I\{\phi_{xy}\}$ for deriving the phase angle of $\phi_{xy}$.

5. A system for deriving the transfer function of tested equipment in response to an input $x(t)$ and an output $y(t)$ of said equipment having means responsive to $x(t)$ and $y(t)$ for deriving the real $R\{\phi_{xy}\}$ and imaginary $I\{\phi_{xy}\}$ parts of the cross spectrum between $x(t)$ and $y(t)$ comprising a non-scanned oscillator deriving out of phase oscillations $\sin w_0 t$ and $\cos w_0 t$, first and second channels respectively responsive to $x(t)$ and $y(t)$, said first and second channels both being responsive to said out of phase oscillations for respectively deriving the real and imaginary Fourier transforms of $x(t)$ and $y(t)$ at a selected analysis frequency $w_0$, said means for deriving said imaginary part of said cross spectrum comprising first means for multiplying said real Fourier transform of $x(t)$ with said imaginary transform of $y(t)$, second means for multiplying said imaginary Fourier transform of $x(t)$ with said real Fourier transform of $y(t)$, and means for subtracting the output of one of said multipliers from the output of the other multiplier, and means responsive to $R\{\phi_{xy}\}$ and $I\{\phi_{xy}\}$ for deriving the phase angle of $\phi_{xy}$.

6. A system for deriving the transfer function of tested equipment in response to the input time varying signal $x(t)$ and the output time varying signal $y(t)$ of said equipment comprising a first and a second channel for operating on said time varying signal $x(t)$ and said time varying signal $y(t)$ respectively, each of said first and second channels including
  (a) variable bandpass filter means for rejecting all but the frequencies centered about a selected analysis frequency $w_0$
  (b) first multiplier and filter means for multiplying said bandpass filter means output times the sine of said selected analysis frequency to provide a signal corresponding to the imaginary part of a Fourier transform of the respective time varying signal and second multiplier and filter means for multiplying the output of the bandpass filter times the cosine of said selected analysis frequency to provide a signal corresponding to the real part of a Fourier transform of the respective time varying signal, means for deriving the real $R\{\phi_{xy}\}$ part of the cross spectrum $\phi_{xy}$ which is the copower spectrum of $x(t)$ and $y(t)$ comprising first means connected to said first and second channels for multiplying together said signals corresponding to said real parts of the Fourier transforms of $x(t)$ and $y(t)$, second means connected to said first and second channels for multiplying together said signals corresponding to said imaginary parts of said Fourier transforms of $x(t)$ and $y(t)$, and means for summing the outputs of said first and second multiplying means and for averaging the resultant signal to provide a signal proportional to the copower spectrum of $x(t)$ and $y(t)$.

7. The system of claim 6 in which each of said first and second multiplier and filter means includes variable low pass filter means for averaging the respective multiplied signals.

8. A system for deriving the transfer function of tested equipment in response to the input time varying signal $x(t)$ and the output time varying signal $y(t)$ of said equipment comprising a first and a second channel for operating on said time varying signal $x(t)$ and said time varying signal $y(t)$ respectively, each of said first and second channels including
  (a) variable bandpass filter means for rejecting all but the frequencies centered about a selected analysis frequency $w_0$
  (b) first multiplier and filter means for multiplying said bandpass filter means output times the sine of said selected analysis frequency to provide a signal corresponding to the imaginary part of a Fourier transform of the respective time varying signal and second multiplier and filter means for multiplying the output of the bandpass filter times the cosine of said selected analysis frequency to provide a signal corresponding to the real part of a Fourier transform of the respective time varying signal, means for deriving the imaginary $I\{\phi_{xy}\}$ part of the cross spectrum which is the quadrature power spectrum of $x(t)$ and $y(t)$ comprising first means connected to said first and second channels for multiplying the signal corresponding to the real part of the Fourier transform of $x(t)$ with the signal corresponding to the imaginary part of the Fourier transform of $y(t)$, second means connected to said first and second channels for multiplying the signal corresponding to the imaginary part of the Fourier transform of $x(t)$ with the signal corresponding to the real part of said Fourier transform of $y(t)$, and means for subtracting the output of said first multiplying means from the output of said second multiplying means and for averaging the resultant signal to provide a signal proportional to the quadrature power spectrum of $x(t)$ and $y(t)$.

9. The system of claim 8 in which each of said first and second multiplier and filter means includes variable low pass filter means for averaging the respective multiplied signals.

10. The system of claim 8 in which there is provided means for deriving the copower spectrum of $x(t)$ and $y(t)$ comprising third means connected to said first and second channels for multiplying together said signals corresponding to said real parts of the Fourier transforms of $x(t)$ and $y(t)$, fourth means connected to said first and second channels for multiplying together said signals corresponding to said imaginary parts of said Fourier transforms of $x(t)$ and $y(t)$, and means for summing the output of said third and fourth multiplying means and for averaging the resultant signal to provide a signal proportional to the copower spectrum of $x(t)$ and $y(t)$.

11. The system of claim 10 in which there is provided means for deriving the total cross power spectrum $\phi_{xy}$ between $x(t)$ and $y(t)$ comprising a first circuit for squaring said signal proportional to said copower spectrum, a second circuit for squaring said signal proportional to said quadrature power spectrum, and means for summing the outputs of said first and second squaring circuits and for taking the square root thereof to provide a signal proportional to said total cross power spectrum.

12. The system of claim 10 in which there is provided means for deriving the relative phase angle of $\phi_{xy}$ comprising means connected to said subtracting means and to said summing means for dividing said signal proportional to the quadrature power spectrum by said signal proportional to the copower spectrum and for taking the arc tangent of the resultant signal to provide a signal proportional to said phase angle of $\phi_{xy}$.

13. The system of claim 11 in which there is provided means for deriving the input power spectral density $\phi_{xx}$ comprising first means connected to said first and second channels for squaring the signals corresponding part of the Fourier transform of $x(t)$, second means connected to said first and second channels for squaring the signal corresponding to the imaginary part of the Fourier transform of $x(t)$, and means for adding the output of said first and second squaring means and averaging the resultant signal to obtain a signal proportional to said input power spectral density, first computer means for producing a signal corresponding to the negative of the log of said signal proportional to said input power spectral density, second computer means for producing a signal corresponding to the log of said total cross power spectrum, and means for summing the output of said first and second computer means to provide a signal proportional to the log of the ratio $\phi_{xy}/\phi_{xx}$ which is equal to the log $\angle G(jw)$.

(References on following page)

References Cited

UNITED STATES PATENTS

| | | | |
|---|---|---|---|
| 3,087,674 | 4/1963 | Cunningham et al. | 235—181 X |
| 3,096,479 | 7/1963 | Marks et al. | 324—77 |
| 3,157,781 | 11/1964 | Gruen | 235—181 |
| 3,197,625 | 7/1965 | Ratz | 324—77 X |
| 3,217,251 | 11/1965 | Andrew | 324—77 |

RUDOLPH V. ROLINEC, *Primary Examiner.*

WALTER L. CARLSON, *Examiner.*

P. F. WILLE, *Assistant Examiner.*